US008188986B2

(12) United States Patent
Mau et al.

(10) Patent No.: US 8,188,986 B2
(45) Date of Patent: May 29, 2012

(54) USER INPUT DEVICE WITH DYNAMIC AMBIENT LIGHT CALIBRATION

(75) Inventors: Ming Yong Mau, Penang (MY); Boon How Kok, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 918 days.

(21) Appl. No.: 12/236,368

(22) Filed: Sep. 23, 2008

(65) Prior Publication Data

US 2010/0073327 A1 Mar. 25, 2010

(51) Int. Cl.
*G06F 3/042* (2006.01)
*G06F 3/041* (2006.01)

(52) U.S. Cl. .......................... 345/175; 345/166; 345/173

(58) Field of Classification Search .................... None
See application file for complete search history.

(56) References Cited

U.S. PATENT DOCUMENTS

| 6,816,150 | B2 * | 11/2004 | Casebolt et al. | 345/166 |
|---|---|---|---|---|
| 7,193,203 | B1 * | 3/2007 | Mau et al. | 250/221 |
| 7,313,255 | B2 | 12/2007 | Machida et al. | |
| 7,538,894 | B2 * | 5/2009 | Kobayashi | 356/614 |
| 7,800,594 | B2 * | 9/2010 | Nakamura et al. | 345/175 |
| 7,825,895 | B2 * | 11/2010 | Bynum et al. | 345/156 |
| 7,876,307 | B2 * | 1/2011 | Bieber et al. | 345/166 |
| 2003/0020004 | A1 * | 1/2003 | Reime | 250/214 SW |
| 2003/0021446 | A1 * | 1/2003 | Dietz et al. | 382/107 |
| 2004/0145568 | A1 * | 7/2004 | Ahn | 345/166 |
| 2005/0001153 | A1 * | 1/2005 | Lauffenburger et al. | 250/221 |
| 2005/0200612 | A1 * | 9/2005 | Tanaka et al. | 345/175 |
| 2005/0200613 | A1 * | 9/2005 | Kobayashi et al. | 345/175 |
| 2006/0007170 | A1 * | 1/2006 | Wilson et al. | 345/173 |
| 2006/0007185 | A1 * | 1/2006 | Kobayashi | 345/176 |
| 2006/0028442 | A1 * | 2/2006 | Bynum et al. | 345/157 |
| 2006/0132443 | A1 * | 6/2006 | Chien Wu | 345/166 |
| 2006/0170658 | A1 * | 8/2006 | Nakamura et al. | 345/173 |
| 2006/0187208 | A1 * | 8/2006 | Wenstrand et al. | 345/166 |
| 2009/0002344 | A1 * | 1/2009 | Wilson et al. | 345/178 |
| 2009/0195503 | A1 * | 8/2009 | Lee et al. | 345/166 |
| 2010/0060567 | A1 * | 3/2010 | Larsen | 345/156 |

* cited by examiner

*Primary Examiner* — Bipin Shalwala
*Assistant Examiner* — Daniel Bedell (57) ABSTRACT

A user input device to generate a shutter threshold adaptive to ambient light conditions. The user input device includes a sensor array, a shutter controller, and a threshold generator. The sensor array obtains image data in response to light incident on the sensor array. The shutter controller is coupled to the sensor array. The shutter controller controls a shutter time during which the sensor array is responsive to the light incident on the sensor array according to a shutter value. The threshold generator is coupled to the shutter controller. The threshold generator dynamically generates a shutter threshold corresponding to the shutter value. The shutter threshold defines a transition of a finger-on/off state.

19 Claims, 12 Drawing Sheets

USER INPUT DEVICE WITH DYNAMIC AMBIENT LIGHT CALIBRATION

BACKGROUND

Optical navigation devices use a light source to illuminate a navigation surface so that an optical imager can generate digital images for computing motion. For example, an optical imager can image a finger on a surface and generate a navigation signal based on comparisons of sequential images.

In conventional optical imagers, the exposure time that the optical imager is sensitive to light is controlled by a shutter controller. Like a physical shutter, an electronic shutter controls the time that light is allowed to integrate on photodiodes within the optical imager. The shutter duration, or time that the optical imager integrates the light, can depend on the amount of internal light (e.g., when a finger is placed on the optical imager) and the amount of ambient light (e.g., when the finger is not placed on the optical imager). Some conventional imagers use fixed values for the shutter durations. Other conventional imagers use variable shutter values which continuously adjust to optimize the navigation signals. Variable shutter values can adjust continuously to changing levels of ambient light that exist around the optical imager. However, the variability of the shutter values can make it difficult to detect a transition between navigations states, for example, whether or not a finger is present on the optical imager. Additionally, the changing shutter values can cause erroneous movement detection based on changes in ambient light conditions, even when there is no finger present on the optical imager. The erroneous movement detection is then translated into erroneous navigation signals which are manifested, for example, by erratic cursor movements or content scrolling.

Conventional imagers also use fixed shutter threshold values, which regulate the amount of noise produced during a transition from a finger-on state to a finger-off state, or vice versa. Hence, when the shutter values, or durations, change by more than the fixed shutter thresholds, the optical imager can transition between the finger-on and finger-off states, while limiting the amount of noise that might result, for example, from ambient light starting to enter the optical imager before the optical imager transitions from the finger-on state to the finger-off state. However, as the ambient light levels and the respective shutter values vary, the fixed shutter threshold values may be ineffective. For example, the ambient light conditions may be lighter or darker than the internal light conditions, and the fixed shutter threshold values do not necessarily provide adequate noise regulation in both scenarios.

SUMMARY

Embodiments of a system are described. In one embodiment, the system is a user input device. The user input device includes a sensor array, a shutter controller, and a threshold generator. The sensor array obtains image data in response to light incident on the sensor array. The shutter controller is coupled to the sensor array. The shutter controller controls a shutter time during which the sensor array is responsive to the light incident on the sensor array according to a shutter value. The threshold generator is coupled to the shutter controller. The threshold generator dynamically generates a shutter threshold corresponding to the shutter value. The shutter threshold defines a transition of a finger-on/off state. Other embodiments of the system are also described.

Embodiments of a method for controlling an optical navigation device are also described. In particular, the method includes determining a stable shutter set value for a finger-on state. The stable shutter set value for the finger-on state indicates a plurality of shutter values within a finger-on shutter value tolerance. The method also includes determining a stable shutter set value for a finger-off state. The stable shutter set value for the finger-off state indicates a plurality of shutter values within a finger-off shutter value tolerance. The method also includes dynamically generating a shutter threshold based on the stable shutter set value for the finger-on state and the stable shutter set value for the finger-off state. Other embodiments of the method for controlling an optical navigation device are also described.

Embodiments of a method for dynamically adapting an optical navigation device to changing ambient light conditions are also described. In particular, the method includes obtaining a plurality of shutter samples. The method also includes determining a stability of the plurality of shutter samples relative to a target shutter value. The method also includes setting a stable shutter set value based on at least two stable shutter samples, which are within a shutter sample tolerance of the target shutter value. The method also includes dynamically changing a shutter threshold to adapt to ambient light conditions based on the stable shutter set value. The shutter threshold is indicative of a transition of a finger-on/off state. Other embodiments of the method for dynamically adapting an optical navigation device to changing ambient light conditions are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

While many embodiments are described herein, at least some of the described embodiments provide shutter threshold calibration for a user input device. Shutter threshold calibration facilitates the detection of the presence or absence of a navigation object (e.g., a finger) at the user input device. Detection of the presence or absence of the navigation object facilitates more accurate generation of corresponding navigation signals, which prevents spurious navigation movements caused by ambient light changes even when a navigation object is not on a navigation surface of the user input device. Additionally, by accurately detecting the presence or absence of the navigation object, embodiments of the user input device reduce or minimize sensor array noise (e.g., spurious navigation movements) generated by ambient light. Some embodiments of the shutter threshold calibration described herein may be used to emulate a button click, scrolling, highlighting, or other functions relevant to optical finger navigation.

Figure 1:
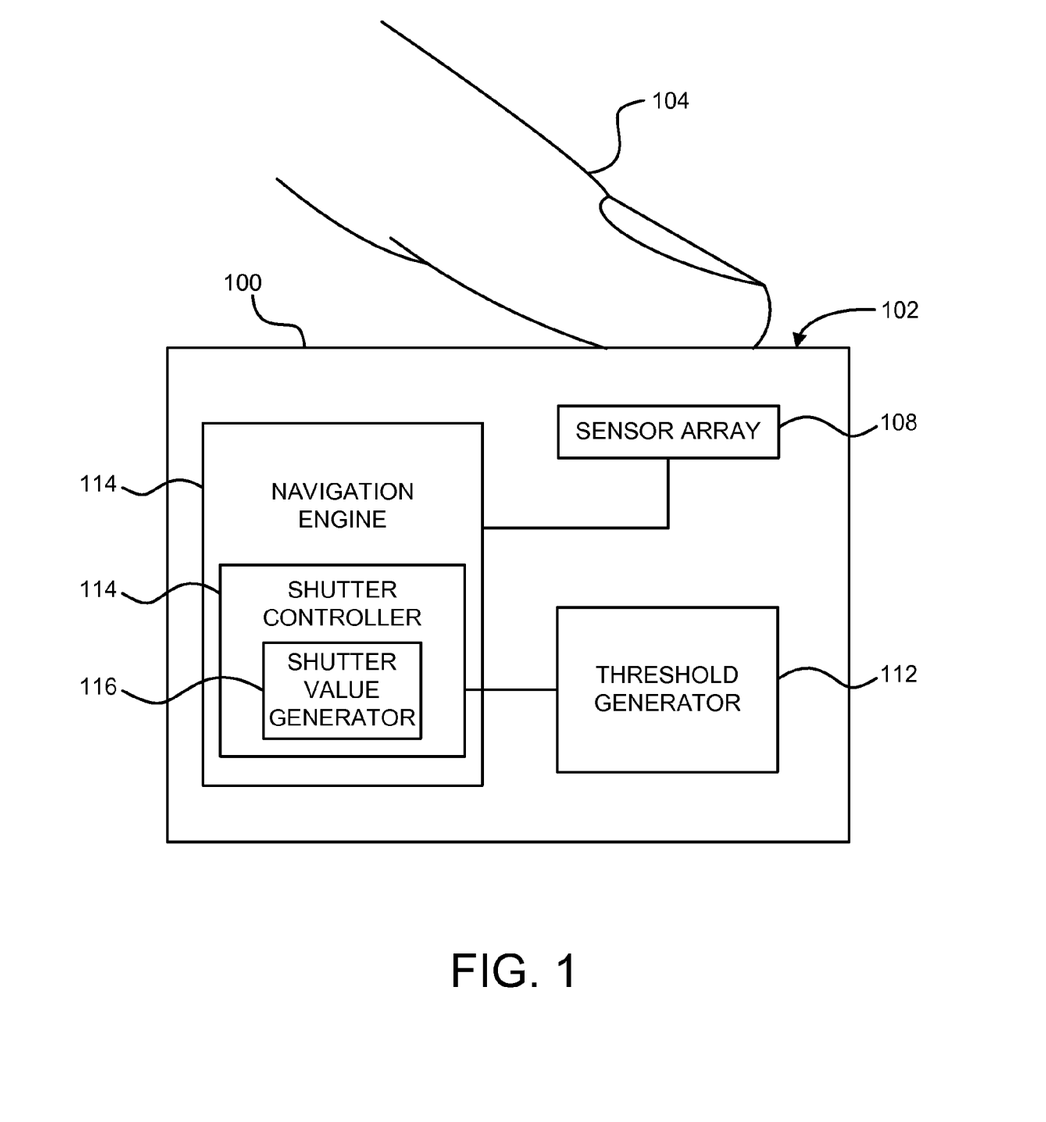
FIG. 1 depicts a schematic diagram of one embodiment of a user input device.

FIG. 1 depicts a schematic diagram of one embodiment of a user input device 100. The user input device 100 includes a navigation surface 102, a sensor array 108, a navigation engine 110, and a threshold generator 112. Although the illustrated user input device 100 is shown and described with certain components and functionality, other embodiments of the user input device 100 may have fewer or more components to implement less or more functionality. For example, some embodiments of the user input device 100 may include an internal light source (not shown) to direct light toward the navigation surface 102. Additionally, it should be noted that the drawing elements shown in FIG. 1 are not to scale.

The navigation surface 102 provides a location for contact between a navigation object 104 such as a user's finger and the user input device 100. Typical navigation objects 104 include a user's finger, a stylus, or another object suitable for contact with the navigation surface 102 of the user input device 100. In some embodiments, the navigation surface 102 of the user input device 100 is made of light transmissive material such as glass, crystal, or plastic. In another embodiment, the user input device 100 may include an aperture or opening instead of or in addition to the navigation surface 102.

When the navigation object 104 is in contact with the navigation surface 102, the sensor array 108 is configured to detect light reflected from the navigation object 104. When there is not a navigation object 104 in contact with the navigation surface 102, ambient light may be incident on the sensor array 108. In some embodiments, the sensor array 108 is a complementary metal-oxide-semiconductor (CMOS) class sensor. In another embodiment, the sensor array 108 is another type of optical sensor configured to detect light patterns.

In some embodiments, the sensor array 108 includes an array of distinct photodetectors (not shown), for example, a 16×16 or 32×32 array of distinct photodetectors configured to detect light that is reflected from the illuminated spot on the navigation surface. Each of the photodetectors in the sensor array 108 generates light intensity information that is output as a digital value (e.g., an 8-bit digital value). Image information is captured by the sensor array 108 in frames, where a frame of image information includes a set of simultaneously captured values for each distinct photodetector in the sensor array 108. Image frames captured by the sensor array 108 include data that represents features on the navigation surface 102 and/or the navigation object 104 in contact with the navigation surface 102. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

The navigation engine 110 is coupled to the sensor array 108. In general, the navigation engine 110 generates an optical navigation signal in response to movement of the navigation object 104 on the navigation surface 102. More specifically, the navigation engine 110 compares successive image frames from the sensor array 108 to determine the movement of image features between frames. In particular, the navigation engine 110 determines lateral movement by correlating common features that exist in successive image frames from the sensor array 108. The lateral movement between image frames is expressed in terms of movement vectors in, for example, X and Y directions (e.g., $\Delta X$ and $\Delta Y$). The movement vectors are then used to determine the movement of the user input device 100 relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

In the depicted embodiment, the navigation engine 110 includes a shutter controller 114, which includes a shutter value generator 116. In some embodiments, the shutter controller 114 provides a signal to control the integration time of the photodetectors of the sensor array 108, or the amount of time during which the photodetectors are responsive to the light incident on the photodetectors. In particular, the shutter value generator 116 generates a shutter value, which the shutter controller 114 uses to control the time that the photodetectors of the sensor array 108 are responsive to the light incident on the sensor array 108. In one embodiment, the shutter value generator 116 is configured to generate shutter values based on the amount of light that is incident on the sensor array 108. In this way, the shutter value generator 116 may vary the shutter value over time. In an embodiment, the shutter value is a 16 bit value stored in two 8-bit registers. Other embodiments may use a different number of bits and/or registers for the shutter value.

In one embodiment, the threshold generator 112 is coupled to the navigation engine 110. Alternatively, the threshold generator 112 may be integrated with the navigation engine 110. For example, some embodiments of the threshold generator 112 may be incorporated within the shutter controller 114. In general, the threshold generator 112 generates a shutter threshold. The shutter threshold relates to a tolerance of variation in the actual shutter values compared with the target shutter values generated by the shutter value generator 116. The variation between actual and target shutter values may result from the effects of ambient conditions on the electronic circuitry within the user input device 102. Other conditions also may impact the actual shutter values relative to the target shutter values generated by the shutter value generator 116.

In some embodiments, the threshold generator 112 at least partially derives the shutter threshold from the shutter values generated by the shutter value generator 116. In some embodiments, the shutter threshold corresponds to an ambient light condition at the sensor array 108. Additionally, the threshold generator 112 may dynamically adjust the shutter threshold based on a change in the ambient light conditions. Although a single shutter threshold is described in many embodiments herein, the threshold generator 112 may generate multiple shutter thresholds. For example, the threshold generator 112 may generate a low threshold and a high threshold based on low and high ambient light conditions, respectively. In another embodiment, multiple shutter thresholds are based on a percent of the low shutter value. In another embodiment, multiple shutter thresholds are based on a percentage of the high shutter value.

In one embodiment, the threshold generator 112 uses a stable shutter set value determined by the navigation engine 110. The stable shutter set value is based on a sequential sampling of actual shutter values determined to be within a variance range (e.g., 10%) of a target shutter value. Once the actual shutter values are determined to remain within the variance range for a specified period of time, the threshold generator 112 may generate the stable shutter set value. The stable shutter set value may be used to generate a shutter threshold as a percentage of the stable shutter set value.

Figure 2A:
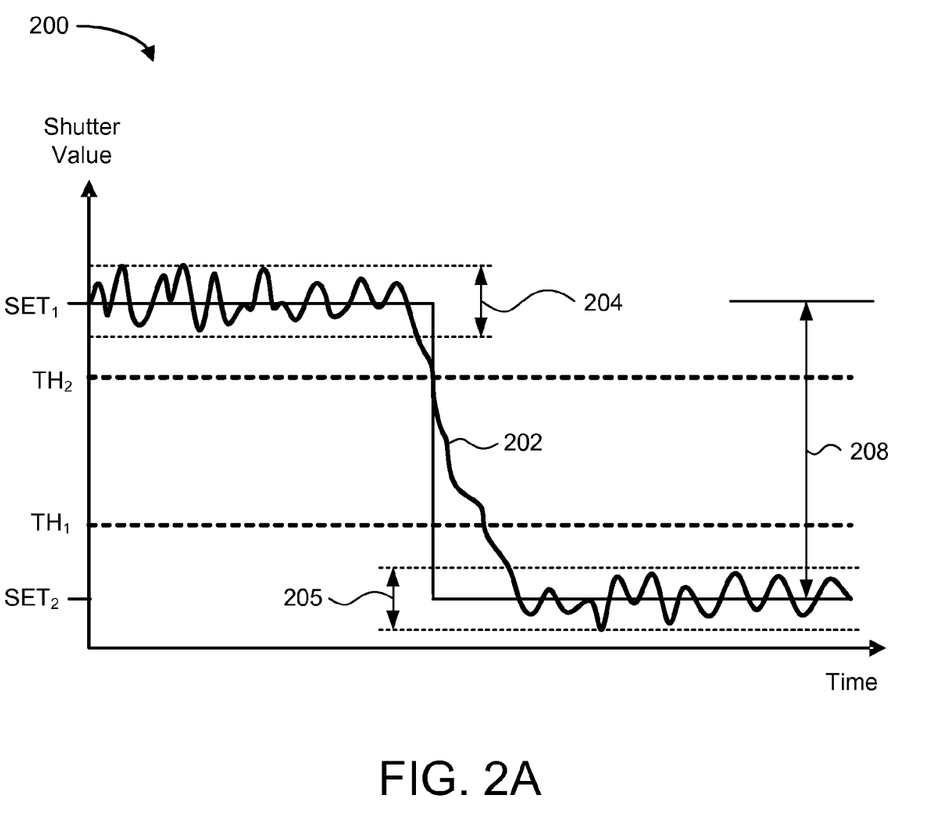
FIGS. 2A and 2B depict graphical representations of shutter thresholds relative to approximate shutter values.
Figure 2B:
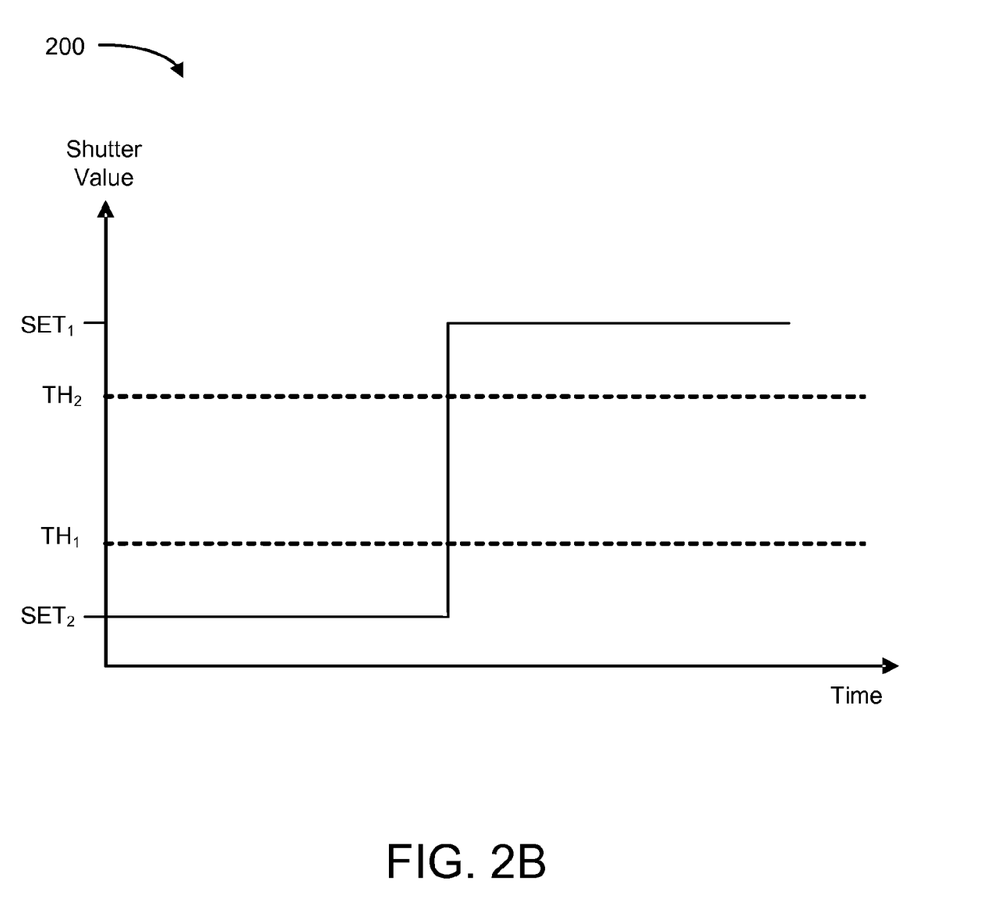

FIGS. 2A and 2B depict graphical representations of shutter thresholds relative to approximate shutter values. In particular, FIG. 2A depicts a graph 200 of the change in actual shutter values 202 over time. The graph 200 shows that the actual shutter value 202 varies with respect to time. This variation in actual shutter values may be a result of, for example, changes in ambient operating conditions and/or hardware operating tolerances. As an example, the actual shutter value 202 may be relatively long for operation in relatively dark ambient conditions, but the actual shutter value 202 may be relatively short for operation in relatively bright ambient conditions. Hence, the shutter value 202 for the finger-off state of the user input device 100 may change drastically over time depending on the ambient light conditions. In contrast, the shutter value 202 for the finger-on state may remain relatively stable, regardless of the ambient light conditions, because the finger blocks ambient light and the intensity of the internal light source of the user input device 100 is relatively constant. The constant nature of the internal light source may change, however, under some circumstance. For example, the aging of the internal light source may cause the intensity of the reflected light to decrease. Additionally, the intensity of the reflected light may change depending on the finger coverage at the navigation surface 102 (i.e., how much ambient light, if any, is incident on the sensor array 108 during the finger-on state).

On the left side of the graph 200, the shutter value 202 is within a variance 204, which indicates sufficient stability in the shutter value 202 to generate a stable shutter set value $SET_1$. In some embodiments, the stable shutter set value $SET_1$ is generated by averaging the measured shutter values 202 over the time period of interest. Other embodiments use other methods to generate the stable shutter set value $SET_1$. Similarly, on the right side of the graph 200, the shutter value 200 is within another variance 205, which indicates sufficient stability in the shutter value 202 to generate another stable shutter set value $SET_2$. This stable shutter set value $SET_2$ also may be generated by averaging the measured shutter values 202 over the time period of interest. Using this method of monitoring the actual shutter values over time, the threshold generator 112 is able to establish stable shutter sets $SET_1$ and $SET_2$ for the different operating conditions.

The shutter values 202 shown in the graph 200 of FIG. 2A may represent various ambient lighting conditions. In one embodiment, the left portion of the graph 200 represents a finger-on state, and the right portion of the graph 200 represents a finger-off state under relatively brighter ambient light conditions, resulting in shorter shutter values 202. Alternatively, the right portion of the graph 200 may represent a finger-on state, and the left portion of the graph 200 may represent a finger-off state under relatively dark ambient light conditions, resulting in longer shutter values 202. In any case, the finger-on/off state that is represented by a particular graphical representation depends on the brightness of the reflected internal light source during a finger-on condition relative to the brightness or darkness of the ambient light conditions.

Also, it should be noted that graphical representations may be envisioned for changing ambient lighting conditions which remain in a finger-off state. For example, an abrupt change in the ambient light conditions (e.g., from bright to dark, or from dark to bright) may impact the calibration of the user input device 100 and initiate a re-calibration of the user input device 100 in order to properly maintain the finger-off state.

Using the stable shutter set values $SET_1$ and $SET_2$ established for the different operating conditions, one or more shutter thresholds may be set. In the illustrated graph 200 of FIG. 2A, a first shutter threshold $TH_1$ is established for the high shutter values which correspond to the stable shutter set value $SET_1$, and a second shutter threshold $TH_2$ is generated for the low shutter values which correspond to the other stable shutter set value $SET_2$. In one embodiment, the variances 204 and 205 for the high and low shutter values 202 are the same value. In another embodiment, the variances 204 and 205 for the high and low shutter values 202 are separate and distinct values. In some embodiments, the parameters for setting the thresholds $TH_1$ and $TH_2$ are dependent on a magnitude of the shutter set difference 208.

The thresholds $TH_1$ and $TH_2$ facilitate the determination of a finger-on/off state. In one embodiment, the lower threshold $TH_1$ defines the finger-on state. If the shutter values 202 are below the lower threshold $TH_1$, then the finger-on state is detected and navigational data is gathered. If the shutter values 202 are above the lower threshold $TH_1$, then the finger-off state is detected and navigational data is not gathered.

In an alternative embodiment, the upper threshold $TH_2$ defines the finger-on state. In this example, the shutter values 202 above the upper threshold $TH_2$ are used to generate a navigation signal, and the shutter values 202 below the upper threshold $TH_2$ are not used to generate a navigation signal. Other embodiments use other configurations to define the finger-on/off states and threshold functions. In some embodiments, the use of two or more thresholds provides more control of motion parameters compared to the use of a single threshold.

In this manner, the passing of certain shutter thresholds may cause a transition from the finger-on state to the finger-off state, or vice-versa. For example, passing one or more shutter thresholds may cause a change from the finger-on state to the finger-off state and, hence, cause navigation signals to be suppressed in order to prevent spurious navigation movements. As another example, passing one or more shutter thresholds may cause a change from the finger-off state to the finger-on state and, hence, initiate the generation of navigation signals representative of lateral movement corresponding to the lateral motion of the finger detected at the sensor array 108.

FIG. 2B depicts another embodiment of the shutter thresholds relative to approximate shutter values. The stable shutter set values $SET_1$ and $SET_2$ of FIG. 2B are shown opposite the stable shutter set values $SET_1$ and $SET_2$ illustrated in FIG. 2A. In particular, the graph 200 of FIG. 2B shows the shutter set values $SET_1$ and $SET_2$ initially at a stable low value (e.g., $SET_2$) and then rising to a stable high value (e.g., $SET_1$). Hence, the low threshold $TH_1$ is initially closer to the low stable shutter set value $SET_2$, and the high threshold $TH_2$ is closer to the later high stable shutter set $SET_1$. In one embodiment, the lower shutter set value $SET_2$ that is below the threshold $TH_1$ is indicative of the finger-on state, and the upper shutter set value $SET_1$ that is above the upper threshold $TH_2$ is indicative of the finger-on state. In this example, at the time that the shutter values 202 cross from below the threshold $TH_1$ to above the threshold $TH_1$, the user input device 100 transitions from the finger-on state to the finger-off state, and the user input device 100 discontinues generation of navigation signals from light detected at the sensor array 108. Thus, the user input device 100 eliminates or reduces the effects of ambient light that might enter the user input device 100 and impinge on the sensor array 108 while the user input device 100 is in the finger-off state. In another embodiment, the finger-on state is defined above the upper threshold $TH_2$, and the finger-off state is defined below the lower threshold $TH_1$. Other variations on the transitions across the shutter thresholds may be used to indicate transitions between the finger-on and finger-off states of the user input device 100.

Figure 3A:
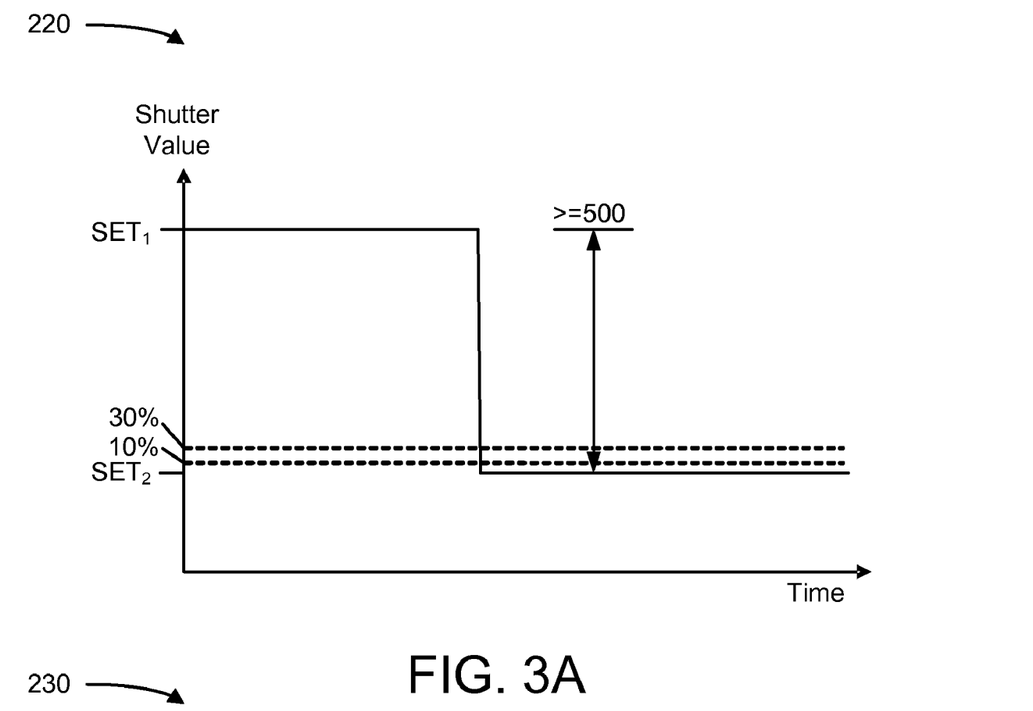
FIGS. 3A-3C depict graphical representations of shutter thresholds as a percentage of the low shutter values of the approximate shutter values.

FIG. 3A depicts a graphical representation 220 of shutter thresholds as a percentage of the low shutter value of the approximate shutter values. In particular, the example shown in FIG. 3A corresponds to a relatively large difference (e.g., greater than 500, expressed in decimal format) between the low and high stable shutter set values $SET_1$ and $SET_2$. In this example, the lower and upper thresholds $TH_1$ and $TH_2$ are set at 10% and 30%, respectively, of the lower stable shutter set value $SET_2$. In one embodiment, the finger-on state is defined as below the 10% threshold. In another embodiment, the finger-on state is defined as being above the 30% threshold. Other embodiments use other configurations to determine the finger-on/off states.

Figure 3B:
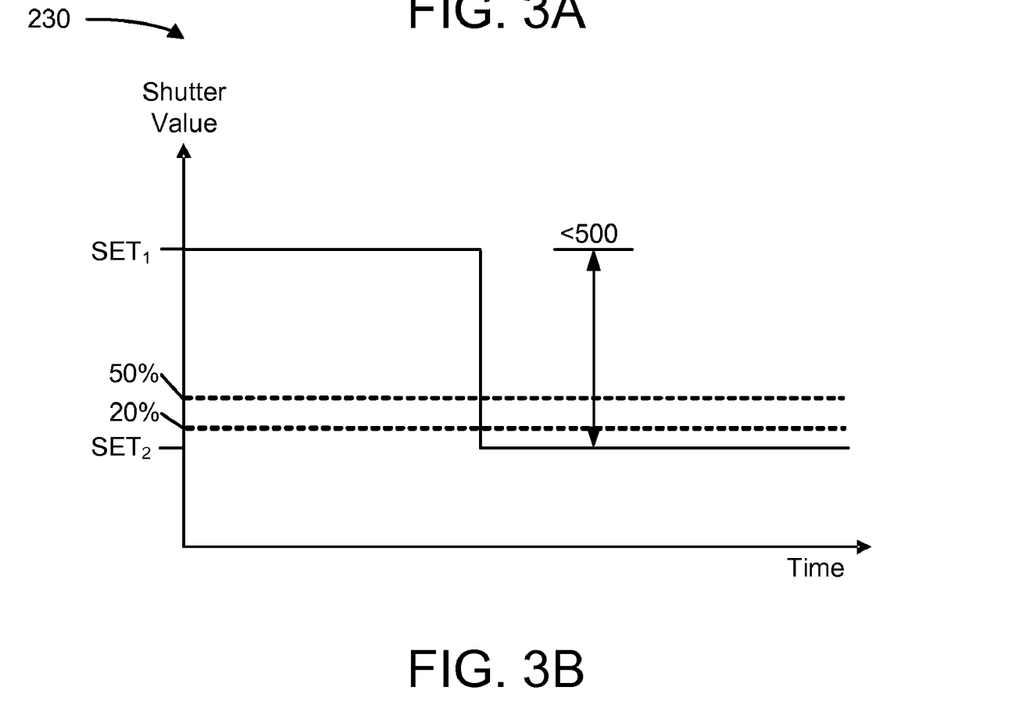

FIG. 3B depicts a graphical representation 230 of additional thresholds as a percentage of the low shutter value of the approximate shutter values. In this example, for a difference of less than about 500 between the lower and upper stable shutter set values $SET_1$ and $SET_2$, the lower threshold is set at about 20% of the lower stable shutter set value $SET_2$, and the upper threshold is set at about 50% of the lower stable shutter set value $SET_2$. In some embodiments, the percentages for the lower and upper thresholds are both set with respect to the lower stable shutter set value $SET_2$. In other embodiments, the percentages for the lower and upper thresholds are based on other values.

Figure 3C:
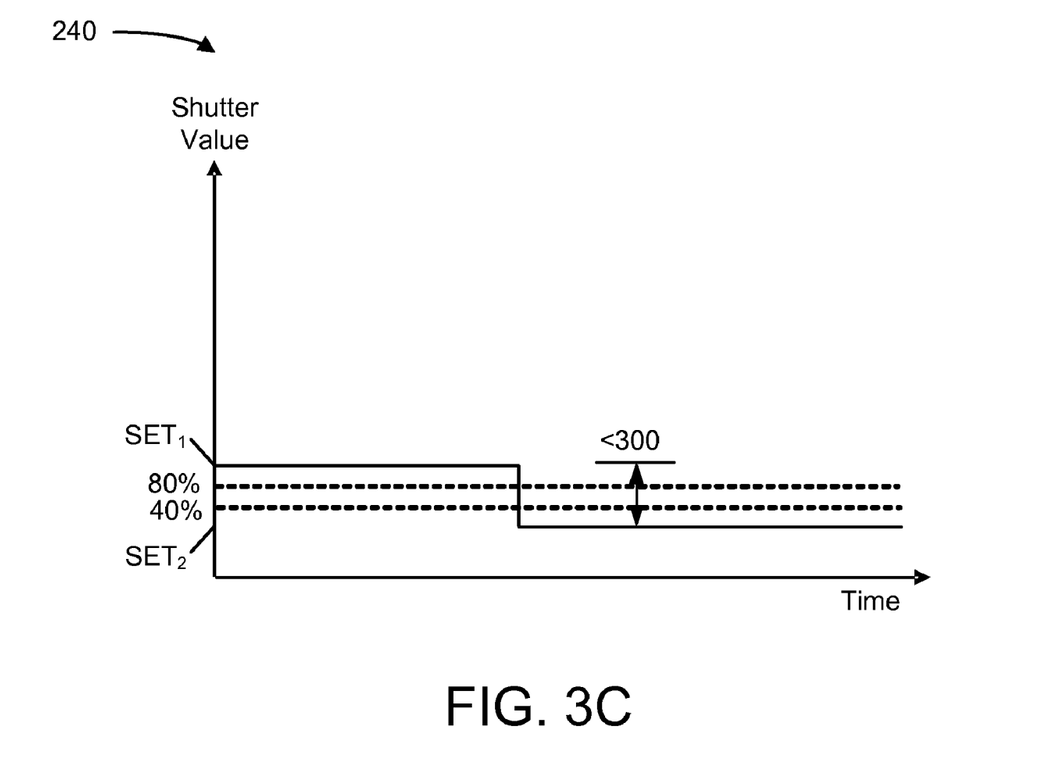

FIG. 3C depicts a graphical representation 240 of additional thresholds as a percentage of the low shutter value of the approximate shutter values. In this example, for a difference of less than about 300 between the lower and upper stable shutter set values $SET_1$ and $SET_2$, the lower threshold is set at about 40% of the lower stable shutter set value $SET_2$, and the upper threshold is set at about 80% of the lower stable shutter set value $SET_2$. As the shutter set difference 208 becomes relatively smaller, the thresholds are set to a larger percentage gap in order to exhibit tighter control parameters in order to allow valid motion to prompt the generation of corresponding navigation signals. Other embodiments may use different control parameters.

Figure 4:
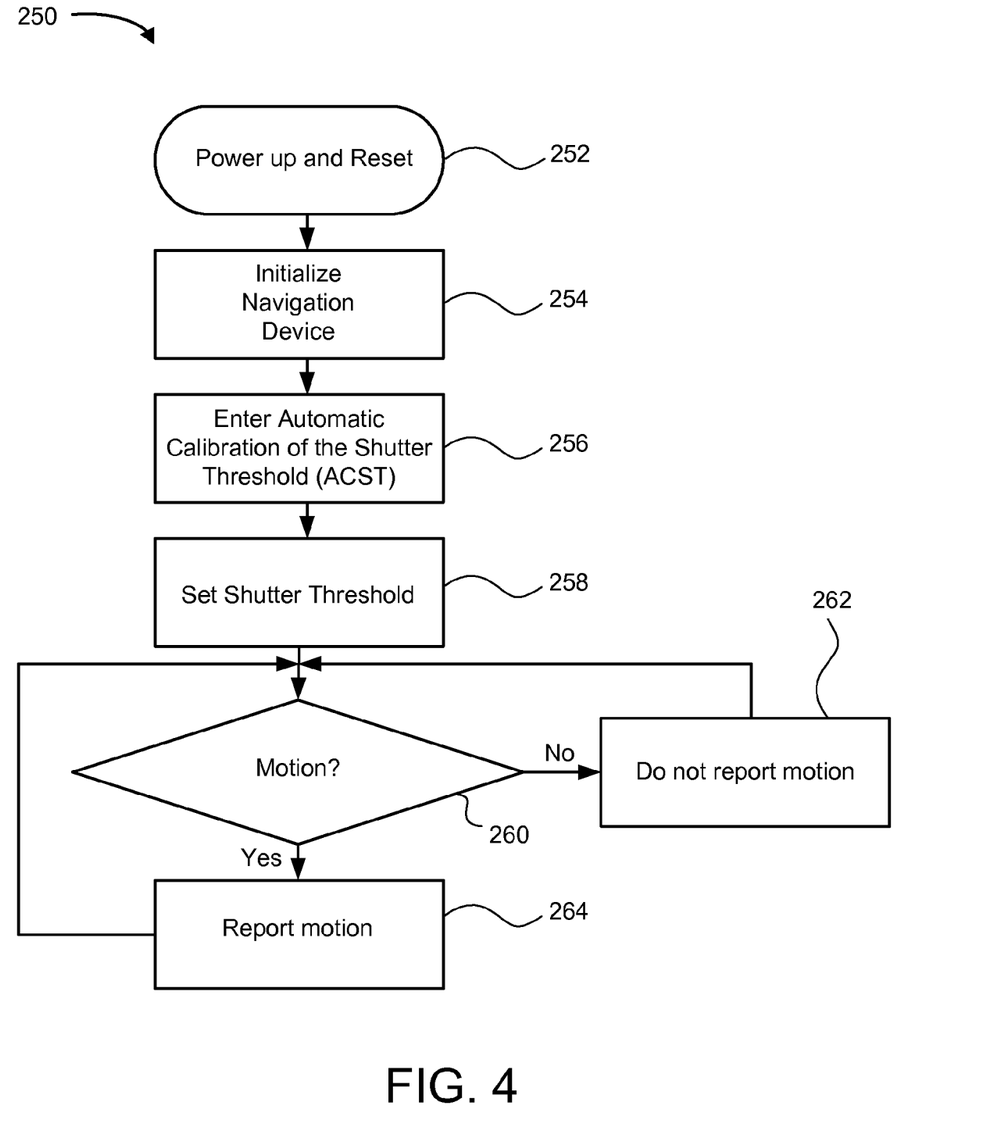
FIG. 4 depicts a flowchart of a process to generate a navigation signal at a user input device.

FIG. 4 depicts a flowchart of a process 250 to generate a navigation signal at a user input device 100. At block 252, the user input device 100 powers up and resets. In some embodiments, previous data is erased. In other embodiments, previous data persists through the power up and reset operations. At block 254, the navigation device 100 initializes. Some examples of initialization activities include setting sensor communication serial peripheral interface (SPI) ports, setting sensor registers (e.g., setting a register to 800 counts per inch (CPI)), and setting sensor configurations. At block 256, the user input device 100 enters an Automatic Calibration of the Shutter Threshold (ACST). Some examples of the operations which might be implemented as part of the ACST stage are described in more detail below with reference to FIGS. 7-10. At block 258, a shutter threshold is set. An example of some of the operations which might be implemented to set the shutter threshold is described in more detail below with reference to FIG. 10. After the shutter threshold is set, the user input device 100 may then enter a navigation mode. At block 260, the user input device 100 determines if motion from a finger or other navigation object is detected. If no motion is detected, then at block 262 no motion is reported and the user input device 100 continues to monitor for motion. If a motion of a finger or other navigation object is detected, then at block 264 the motion of the navigation object 104 is reported. Again, the user input device 100 continues to monitor for additional motion. Also, although not shown, the user input device 100 may return to re-calibrate and re-set the shutter thresholds in response to a change in ambient lighting conditions. Additionally, it should be noted that the user input device 100 stops navigation (e.g., monitoring for finger motion and generating corresponding navigation signals) when a finger-off condition is detected, for example, as a result of the actual measured shutter values crossing a shutter threshold.

Figure 5:
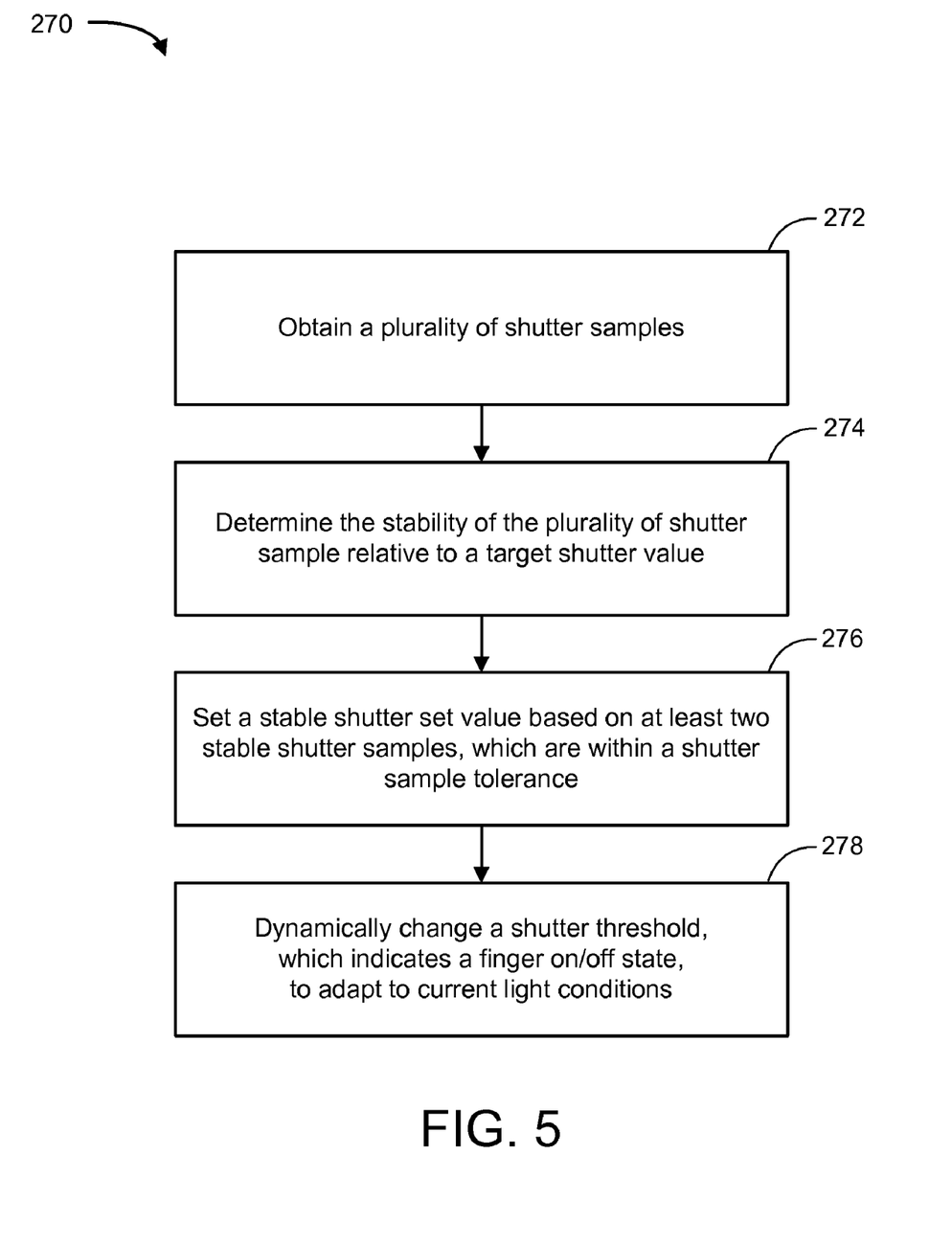
FIG. 5 depicts a block diagram of one embodiment of a method for dynamically adapting the user input device to changing light conditions.

FIG. 5 depicts a block diagram of one embodiment of a method 270 for dynamically adapting the user input device 100 to changing light conditions. At block 272, the sensor array 108 obtains a plurality of shutter samples. At block 274, the navigation engine 110 determines the stability of the measured shutter values relative to a target shutter value. At block 276, the navigation engine 110 sets a stable shutter set value based on at least two stable shutter samples, which are determined to be stable within a shutter sample tolerance. At block 278, the threshold generator 112 dynamically changes a shutter threshold to adapt to current light conditions. The depicted method 270 then ends.

Figure 6:
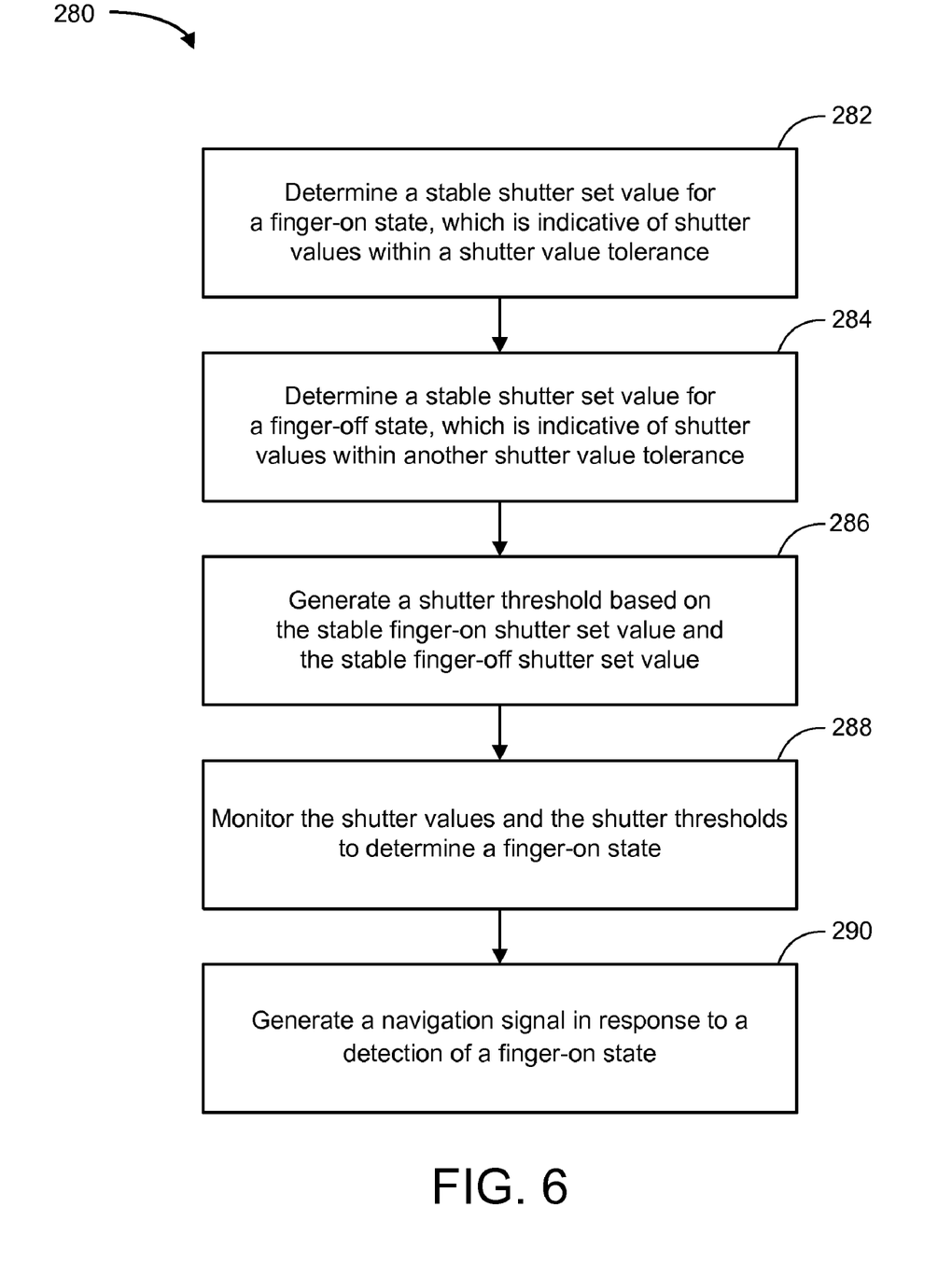
FIG. 6 depicts a block diagram of one embodiment of a method for generating an optical navigation signal.

FIG. 6 depicts a block diagram of one embodiment of a method 280 for generating an optical navigation signal. At block 282, the navigation engine 110 determines a stable shutter set value for a finger-on state. The stable shutter set value is indicative of shutter values within a shutter value tolerance. At block 284, the navigation engine 110 determines a stable shutter set value for a finger-off state within another shutter value tolerance. At block 286, the threshold generator 112 generates a shutter threshold based on the stable finger-on shutter set value and the stable finger-off shutter set value. At block 288, the navigation engine 110 monitors the shutter values and shutter thresholds to determine a finger-on state. At block 290, the navigation engine 110 generates a navigation signal in response to detection of a finger-on state.

FIGS. 7-10 depict a flowchart of one embodiment of operations for automatically calibrating the shutter threshold according to the calibration operation 256 of FIG. 4. At block 304, the sensor array 108 obtains a sample shutter value and stores it to a location Shutter_1. At block 306, the sensor array 108 reads a second sample shutter value and stores it to a location Shutter_2. In one embodiment, the sample shutter values are read according to a timing scheme. In another embodiment, the sample shutter values are read in response to detection of a trigger condition.

Figure 7:
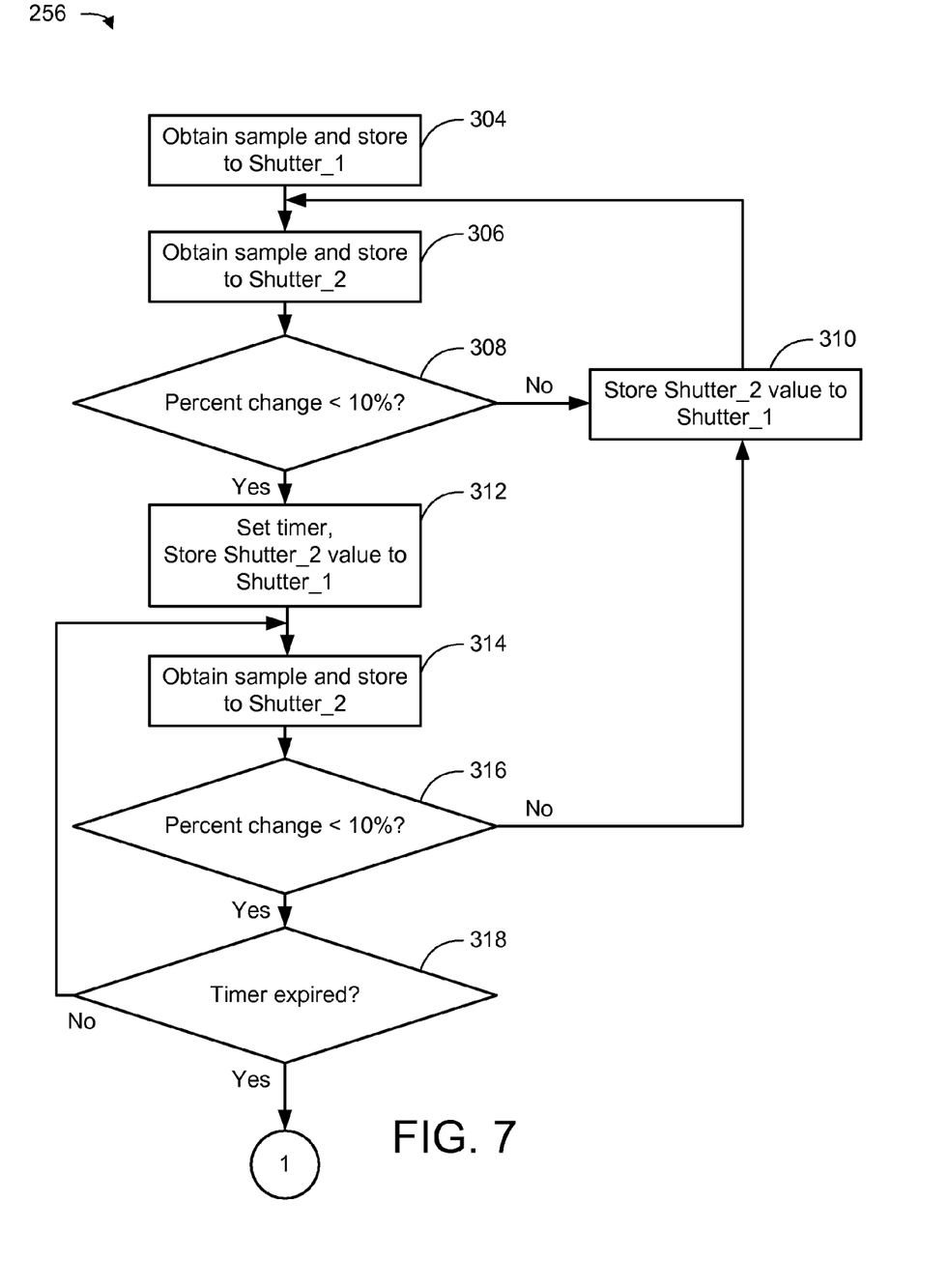
FIGS. 7-10 depict a flowchart of one embodiment of operations for automatically calibrating the shutter threshold according to the calibration operation 256 of FIG. 4.

At block 308, a mathematical operation is used to evaluate a percentage difference between the value stored at Shutter_1 and the value stored at Shutter_2. In one embodiment, the percentage of the difference is evaluated by subtraction and division of the two variables Shutter_1 and Shutter_2 and then checked to determine if the difference is less than 10%. If the difference is not less than 10%, the navigation engine 110 stores the value from Shutter_2 to the variable Shutter_1 and the sensor array 108 obtains and stores a new value to Shutter_2. If, at block 308, the percent difference of Shutter_1 and Shutter_2 is less than 10%, then at block 312 the navigation engine 110 sets a timer (not shown). In one embodiment, the timer is set to 250 milliseconds. Other embodiments may use other timer values. The navigation engine 110 also stores the value from Shutter_2 to Shutter_1.

At block 314, the sensor array 108 obtains and stores a new value to the variable Shutter_2. At block 316, a check similar to the check at block 308 is performed. If the conditions of block 316 are not met the process proceeds to block 310. If a percentage difference between the value stored at Shutter_1 and the value at Shutter_2 is less than 10% the process proceeds to block 318. At block 318, the navigation engine 110 performs a check to evaluate the state of the timer set at block 312. If the timer is not expired the process goes back to block 314. If the timer is expired, the process 256 proceeds to the next stage, as shown in FIG. 8.

Figure 8:
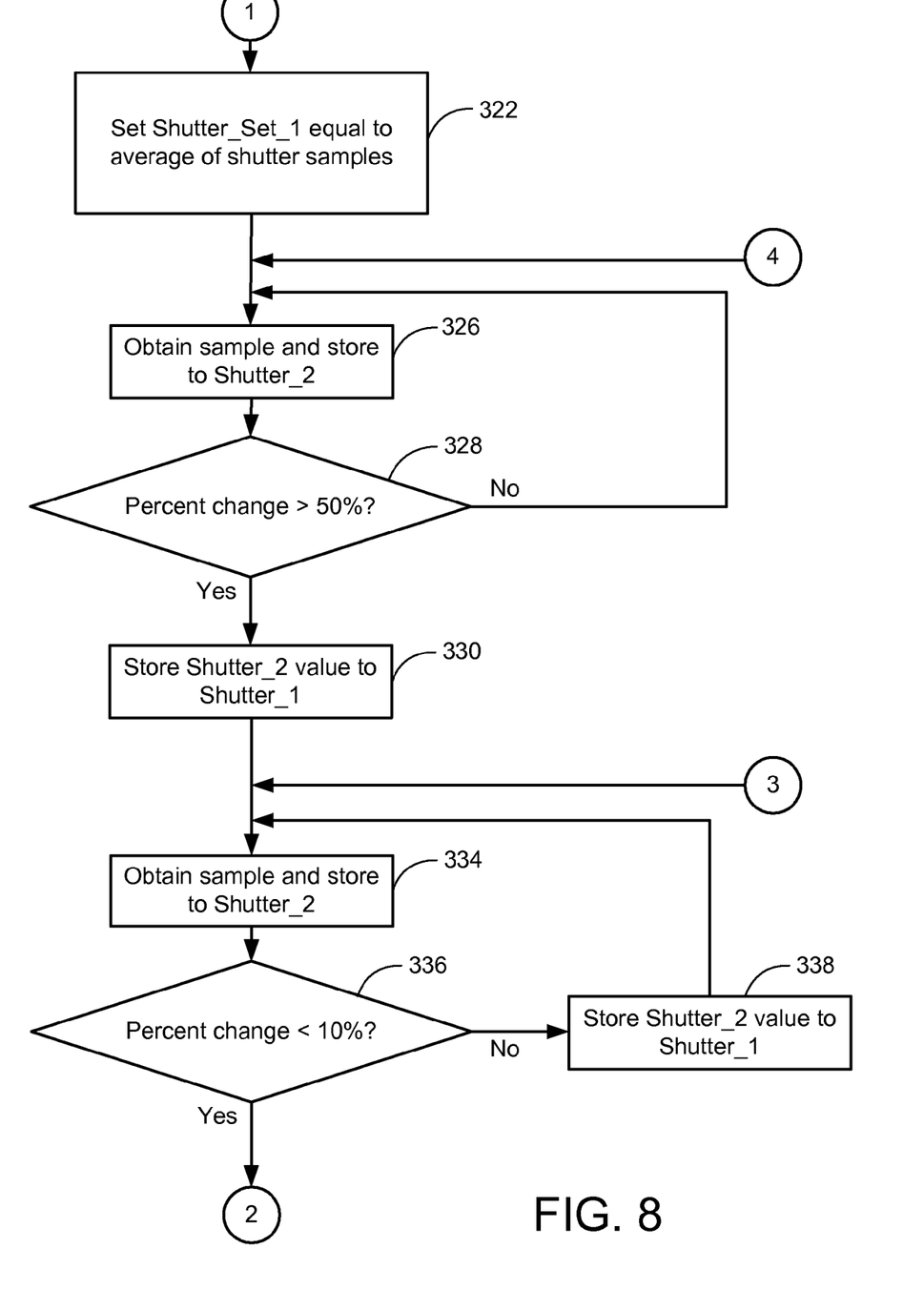
Figure 9:
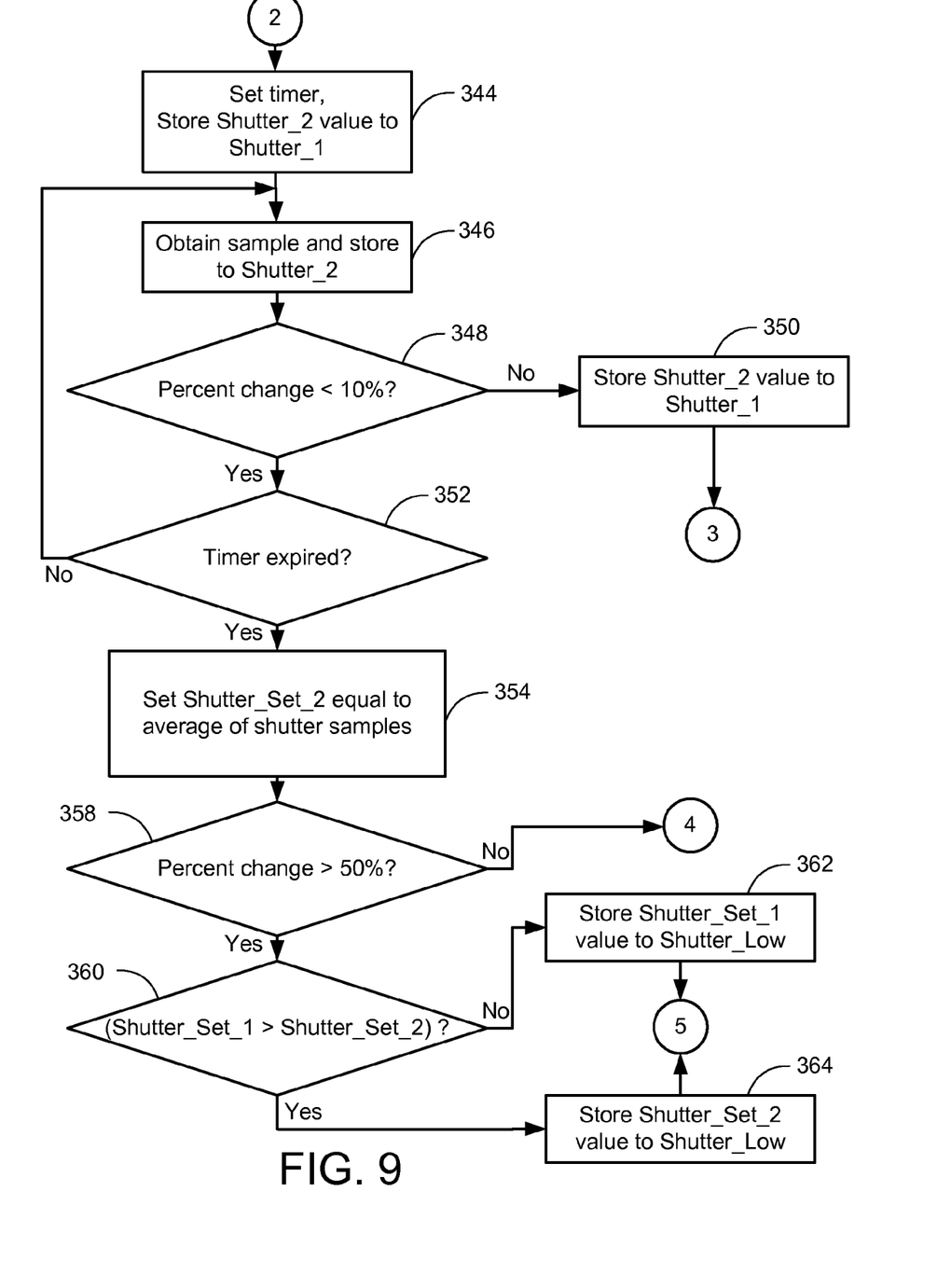

At block 322 of FIG. 8, the navigation engine 110 averages the values of Shutter_1 and Shutter_2 and stores the averaged value at Shutter_Set_1. At block 326, the sensor array 108 obtains and stores a new sample value to Shutter_2. At block 328, a percent variance check between Shutter_1 and Shutter_2 is performed to determine if the percent difference is less than or equal to 50% and, if not, the sensor array 108 obtains and stores a new value to Shutter_2 at block 326. Otherwise, if the percent difference is greater than 50%, the navigation engine 110 proceeds to store the value of Shutter_2 to Shutter_1. At block 334, the sensor array 108 obtains and stores a new value to Shutter_2. At block 336, another percent variance check is performed to determine if the percent difference between the two shutter values, Shutter_1 and Shutter_2, is less than a 10% relative difference. If the percent difference between Shutter_1 and Shutter_2 is more than 10%, the value is unstable and, at block 338, the value from Shutter_2 is stored to Shutter_1 and a new value is read into Shutter_2 at block 334. If the percent variance of Shutter_1 and Shutter_2 is less than 10%, then the values are considered stable and the process continues, as shown in FIG. 9. Although specific percentages (e.g., 50% and 10%) are referenced herein for purposes of providing one or more examples, some embodiments use different percentages to qualify the stability of the values of Shutter_1 and Shutter_2 variables.

At block 344 of FIG. 9, a timer is set and the navigation engine 110 stores the value from Shutter_2 to Shutter_1. At block 346, the sensor array 108 obtains and stores a new value to Shutter_2. At block 348, a stability check is performed to determine if the percent variance in the values for Shutter_1 and Shutter_2 is more than 10%. If the percent difference from Shutter_1 to Shutter_2 is more than 10%, the value of Shutter_2 is stored to Shutter_1 and the process returns to the operations of FIG. 8 just before block 334. If the percent difference between Shutter_1 and Shutter_2 is less than 10% at block 348, the process continues to block 352. If the timer has not expired at block 352, the process returns to block 346. If the timer has expired, the process moves to block 354, where the navigation engine 110 averages the values of Shutter_1 and Shutter_2, and the averaged value is stored to Shutter_Set_2. At block 358, a check is performed with respect to Shutter_Set_1 and Shutter_Set_2 to determine if the percent difference between Shutter_Set_1 and Shutter_Set_2 is less than 50% and, if not, then the process returns to block 326 of FIG. 8. If the percent difference between Shutter_Set_1 and Shutter_Set_2 is more than 50%, another check is performed at block 360. At block 360, the navigation engine 110 compares Shutter_Set_1 and Shutter_Set_2. If Shutter_Set_1 is not greater than Shutter_Set_2 then, at block 362, the navigation engine 110 stores the value from Shutter_Set_1 to Shutter_Low. Otherwise, if Shutter_Set_1 is greater than Shutter_Set_2 then, at block 364, the value stored in Shutter_Set_2 is stored to Shutter_Low. In some embodiments, other qualifying percentages are used to determine the stability of the shutter values.

Figure 10:
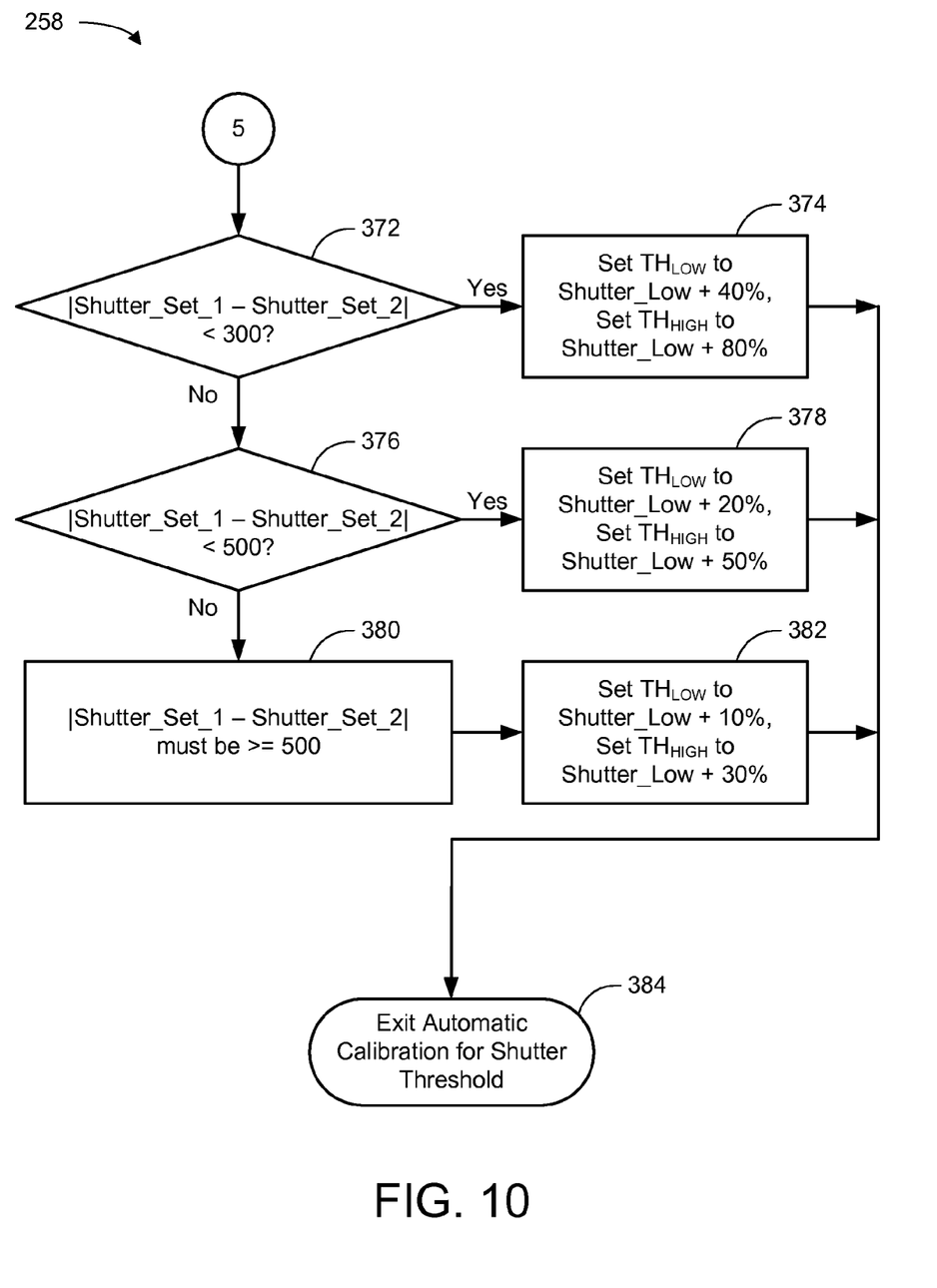

At block 372 of FIG. 10, a check is performed to evaluate the value difference between Shutter_Set_1 and Shutter_Set_2. If the difference is less than 300, the threshold generator 112 sets $TH_{LOW}$ to Shutter_Low+40% and sets $TH_{HIGH}$ to Shutter_Low+80%. Hence, both of the shutter thresholds are set with reference to the lower stable shutter set value. If the value difference between Shutter_Set_1 and Shutter_Set_2 is not less than 300, then at block 376, a second check is performed to evaluate the value difference between Shutter_Set_1 and Shutter_Set_2 to determine if the difference is less than 500, then at block 378 the threshold generator 112 sets $TH_{LOW}$ to Shutter_Low+20% and $TH_{HIGH}$ is set to Shutter_Low+50%. If the value difference between Shutter_Set_1 and Shutter_Set_2 is not less than 500, then at block 380, another check is performed to evaluate the value difference between Shutter_Set_1 and Shutter_Set_2. If the difference is greater than 500, then at block 382 the threshold generator 112 sets $TH_{LOW}$ to Shutter_Low+10% and $TH_{HIGH}$ is set to Shutter_Low+30%. At block 384, the user input device 100 exits the calibration mode and continues at block 260 of FIG. 4. In some embodiments, the process uses fewer or more functional blocks or steps to generate less or more functionality.

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

An embodiment of a user input device includes at least one navigation engine coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A user input device comprising:
   a sensor array to obtain image data in response to light incident on the sensor array;
   a shutter controller coupled to the sensor array, the shutter controller to control a shutter time during which the sensor array is responsive to the light incident on the sensor array according to a shutter value; and
   a threshold generator coupled to the shutter controller, the threshold generator to dynamically generate a shutter threshold corresponding to the shutter value, the shutter threshold to define a transition of a finger-on/off state, wherein the threshold generator is further configured to generate the shutter threshold based on a stability of the shutter time.

2. The user input device of claim 1, wherein the threshold generator is further configured to adapt the shutter threshold based on a difference between low and high shutter times of the shutter controller.

3. The user input device of claim 2, wherein the threshold generator is further configured to set the shutter threshold based on a percentage of the low shutter time of the shutter controller.

4. The user input device of claim 2, wherein the threshold generator is further configured to set a low shutter threshold and a high shutter threshold based on the difference between the low and high shutter times and percentages of the low shutter time.

5. The user input device of claim 1, wherein the shutter controller is further configured to monitor an actual shutter value with respect to the shutter threshold.

6. The user input device of claim 1, further comprising a navigation engine coupled to the sensor array and the shutter controller, the navigation engine configured to generate a navigation signal based on the image data obtained by the sensor array and in response to a trigger signal, wherein the trigger signal is generated in response to the actual shutter value crossing the shutter threshold.

7. The user input device of claim 1, wherein the navigation engine is further configured to detect a temporary presence of the navigation object at the sensor array based on the navigation signal, and to initiate a button click operation based on the detection of the temporary presence of the navigation object at the sensor array.

8. The user input device of claim 1, wherein the threshold generator is further configured to generate a stable shutter set value, wherein the stable shutter set value is within a percent variance between at least two shutter values.

9. A method for controlling an optical navigation device, the method comprising:
   determining a stable shutter set value for a finger-on state, wherein the stable shutter set value for the finger-on state is indicative of a plurality of shutter values within a finger-on shutter value tolerance;
   determining a stable shutter set value for a finger-off state, wherein the stable shutter set value for the finger-off state is indicative of a plurality of shutter values within a finger-off shutter value tolerance; and
   dynamically generating a shutter threshold based on the stable shutter set value for the finger-on state and the stable shutter set value for the finger-off state.

10. The method of claim 9, wherein generating each stable shutter set comprises:
    determining that a plurality of shutter samples are within a shutter sample tolerance; and
    averaging the plurality of shutter samples over a period of time.

11. The method of claim 10, wherein determining that the plurality of shutter samples are within the shutter sample tolerance comprises determining a percent variance of a second shutter sample with respect to a first shutter sample.

12. The method of claim 9, wherein generating the shutter threshold comprises:
    identifying one of the stable shutter set values as a LO shutter set value; and
    setting the shutter threshold as a percentage of the LO shutter set value.

13. The method of claim 9, wherein detecting the finger-on/off state comprises detecting a traverse of the shutter threshold.

14. The method of claim 9, further comprising initiating a button click operation in response to detection of a first transition into the finger-on state and a second transition out of the finger-on state within a predetermined amount of time.

15. The method of claim 9, wherein generating the navigation signal further comprises:
    monitoring the stable shutter set values and the shutter thresholds to detect the finger-on state; and
    generating a navigation signal in response to detection of the finger-on state.

16. A method for dynamically adapting an optical navigation device to changing ambient light conditions, the method comprising:
    obtaining a plurality of shutter samples;
    determining a stability of the plurality of shutter samples relative to a target shutter value;
    setting a stable shutter set value based on at least two stable shutter samples, wherein the stable shutter samples are within a shutter sample tolerance of the target shutter value; and
    dynamically changing a shutter threshold to adapt to ambient light conditions based on the stable shutter set value, the shutter threshold indicative of a transition of a finger-on/off state.

17. The method of claim 16, wherein determining the stability of the plurality of shutter samples comprises comparing at least two shutter samples to determine an amount of variance between the at least two shutter samples.

18. The method of claim 17, further comprising comparing the amount of variance between the at least two shutter samples with a specified percentage of one of the shutter samples.

19. The method of claim 16, wherein dynamically changing the shutter threshold further comprises setting the shutter threshold as a percentage of the stable shutter set value.

* * * * *